(12) United States Patent
Blöcker et al.

(10) Patent No.: US 12,455,260 B2
(45) Date of Patent: Oct. 28, 2025

(54) PHOTO-IONIZATION DETECTOR (PID) WITH MULTIPLE MEASURING CELLS AND PROCESS USING SUCH A PID

(71) Applicant: Dräger Safety AG & Co. KGaA, Lübeck (DE)

(72) Inventors: Tim Blöcker, Lübeck (DE); Lucas Pfennig, Lübeck (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 363 days.

(21) Appl. No.: 18/169,951

(22) Filed: Feb. 16, 2023

(65) Prior Publication Data

US 2023/0266272 A1    Aug. 24, 2023

(30) Foreign Application Priority Data

Feb. 18, 2022 (DE) .................... 10 2022 103 919.6
Jul. 5, 2022 (DE) .................... 10 2022 116 682.1

(51) Int. Cl.
*G01N 27/66* (2006.01)
*G01N 27/64* (2006.01)

(52) U.S. Cl.
CPC ............ *G01N 27/66* (2013.01); *G01N 27/64* (2013.01)

(58) Field of Classification Search
CPC ................................ G01N 27/66; G01N 27/64
USPC ........................................................ 324/464
See application file for complete search history.

(56) References Cited

U.S. PATENT DOCUMENTS

| 6,320,388 | B1 | 11/2001 | Sun et al. | |
| 10,101,298 | B1 | 10/2018 | Zhang et al. | |
| 2002/0179846 | A1* | 12/2002 | Sun ................... | G01N 33/0026 250/423 P |
| 2003/0146759 | A1* | 8/2003 | Bashkirov ............. | G01N 27/64 324/464 |
| 2004/0203169 | A1* | 10/2004 | Dreyer ............... | G01N 21/3504 436/164 |
| 2012/0136268 | A1* | 5/2012 | Li .......................... | G01N 27/66 324/464 |
| 2013/0045541 | A1* | 2/2013 | Fix ..................... | G01N 33/0013 436/164 |

FOREIGN PATENT DOCUMENTS

| DE | 19828903 A1 | 1/2000 |
| EP | 1262770 A2 | 12/2002 |
| WO | 9427141 A1 | 11/1994 |

* cited by examiner

*Primary Examiner* — Raul J Rios Russo
(74) *Attorney, Agent, or Firm* — McGlew and Tuttle, P.C.

(57) ABSTRACT

A photo-ionization detector (100) and a process detect an ionizable substance in a gas (G). At least two measuring cells (20.1, 20.2, 20.3) are mounted on a measuring cell carrier (10). A radiation source (4) emits ionizing electromagnetic radiation towards the measuring cell carrier (10). The gas (G) reaches at least one measuring cell (20.1, 20.2, 20.3). Ionization of the gas causes a measurable electrical property of the measuring cell (20.1, 20.2, 20.3) to be changed. Depending on the electrical property, the measuring cell (20.1, 20.2, 20.3) generates a signal. This signal correlates with the presence and optionally the concentration of ionizable substance in the gas (G). Preferably, the measuring cell carrier (10) can be rotated relative to the radiation source (4).

14 Claims, 7 Drawing Sheets

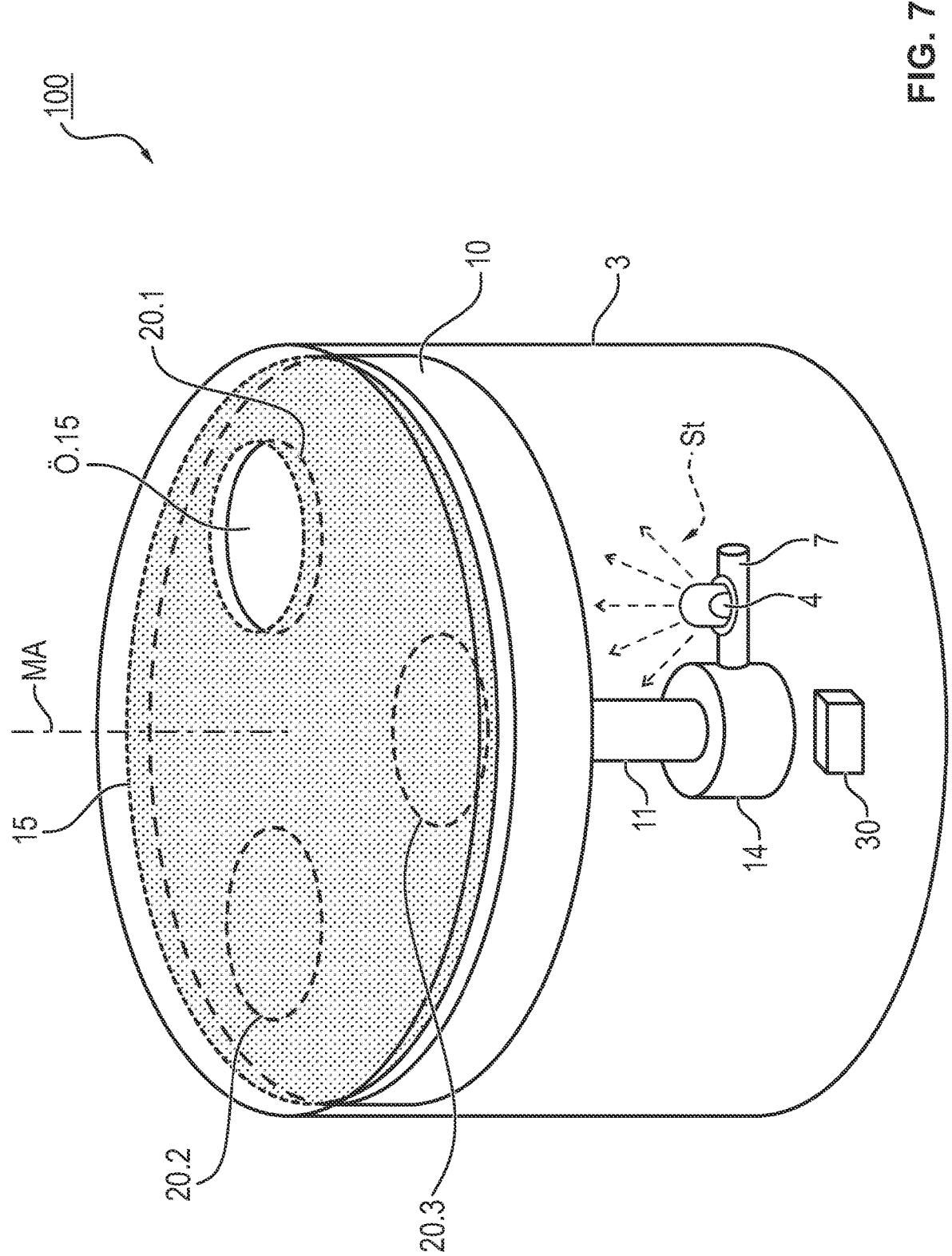

PHOTO-IONIZATION DETECTOR (PID) WITH MULTIPLE MEASURING CELLS AND PROCESS USING SUCH A PID

CROSS REFERENCE TO RELATED APPLICATIONS

This application claims the benefit of priority under 35 U.S.C. § 119 of German Applications 10 2022 103 919.6, filed Feb. 18, 2022, and 10 2022 116 682.1, filed Jul. 5, 2022, the entire contents of which are incorporated herein by reference.

TECHNICAL FIELD

The invention relates to a photo-ionization detector and a process for detecting an ionizable substance in a gas.

BACKGROUND

A photo-ionization detector (PID), as known from the prior art, comprises a measuring electrode and a radiation source which emits electromagnetic radiation, in particular UV light, into a measuring section. A sample of the gas to be examined is located in this measuring section. The emitted radiation ionizes molecules of an ionizable substance, with the ionizable substance being part of a gas in the measuring section. The ionization changes an electrical property of the measuring electrode. A sensor measures an indication of this changeable electrical property. The PID according to the invention also uses this principle.

Different PIDs have become known.

U.S. Pat. No. 10,101,298 B1 describes a PID comprising a chamber assembly 400 with three chambers 401, 402, and 403 and a radiation source assembly 407 with UV lamp 408, see FIG. 4. Two electrodes are arranged in each chamber 401, 402, 403. The measuring chamber 401 is permanently in fluid communication with the environment, and a pump 409 can draw gas to be investigated through this fluid communication into the measuring chamber 401. The measurement chambers 402 and 403 are each filled with a reference gas and are separated from the environment. A drive 406 is capable of rotating the measuring arrangement 400 and thereby causing the electromagnetic radiation emitted by the radiation source 407 to reach the measuring chamber 401 or the measuring chamber 402 or the measuring chamber 403, depending on the rotational position of the measuring arrangement 400. Using the measuring chambers 402 and 403, the PID can be calibrated.

The PID of WO 94/27141 A1 comprises three radiation sources in the form of three gas discharge lamps 11a, 11b and 11c, cf. FIG. 5. These radiation sources 11a, 11b, 11c can emit electromagnetic radiation with different photon energies. Each radiation source 11a, 11b, 11c is associated with a measuring unit comprising an electrode 23a, 23b, 23c, a mesh electrode 22a, 22b, 22c and an electrometer 29a, 29b, 29c. The gas to be investigated is directed along a path extending between the three radiation sources on one side and the three measuring units on the other side.

DE 198 28 903 A1 discloses a PID 1 with an anode 15 and a cathode 3, cf. FIG. 3. A radiation source in the form of a UV lamp 2 emits electromagnetic radiation in the direction of the PID 1. A mechanical chopper 10 is arranged between the radiation source 2 and the PID 1. A motor drive 11 rotates the chopper 10, and this interrupts the incident UV light cyclically.

SUMMARY

It is an object of the invention to provide a photo-ionization detector and a process having a higher reliability than known photo-ionization detectors and processes.

The object is achieved by a photo-ionization detector having features according to the invention and by a process having features according to the invention. Advantageous embodiments of the photo-ionization detector according to the invention are, as far as useful, also advantageous embodiments of the process according to the invention and vice versa.

The photo-ionization detector according to the invention (hereinafter: PID) and the process according to the invention are capable of detecting whether or not an ionizable substance is present in a gas. Thus, the photo-ionization detector and the process are able to monitor a spatial area for the presence of the ionizable substance. The gas to be analyzed (more precisely, a gas sample of this gas) is in an environment of the PID and can reach the interior of the PID, where it can be analyzed by a measuring cell of the PID.

The photo-ionization detector according to the invention comprises a radiation source. This radiation source is capable of emitting electromagnetic radiation. The emitted electromagnetic radiation is capable of ionizing an ionizable substance to be detected. By "ionization" is meant a process in which, under the influence of electromagnetic radiation, a molecule is split into at least one electrically negatively charged electron and one positively charged ion, namely the molecule without the split-off electron or electrons.

Furthermore, the photo-ionization detector according to the invention comprises a measuring cell carrier and at least two different measuring cells, preferably at least three different measuring cells. Each measuring cell is mounted on the measuring cell carrier, and preferably in such a way that the measuring cell cannot move relative to the measuring cell carrier. Therefore, a measuring cell also cannot move relative to another measuring cell on the measuring cell carrier. Preferably the measuring cell carrier separates the measuring cells from each other in a fluid-tight manner. It is possible that in addition the PID has a measuring cell that is not mounted on the measuring cell carrier.

Each measuring cell comprises a respective measuring electrode and preferably a respective counter electrode. The measuring electrode has a measurable electrical property, for example the strength or the amount (electrical charge) of the electrical current flowing through the measuring electrode or an electrical voltage between the measuring electrode and the optional counter electrode or an electrical voltage between two measuring points of the measuring electrode or the electrical resistance of the measuring electrode. Ionization of ionizable substance in the gas changes this measurable electrical property compared to a state without ionizable substance. The measurable electrical property is changed when there is a sufficiently large amount of ionizable substance inside the PID compared to a state without ionizable substance. Preferably, the greater the concentration of ionizable substance, the more the measurable property is changed.

The measuring cell is capable of generating a signal, preferably an electrical signal, depending on the electrical property. This generated signal correlates with the presence and optionally with the concentration of ionizable substance in the gas.

Note: Several ionizable substances to be detected may be present in the gas to be analyzed. In the following, when the terms "the presence" and "the concentration" of ionizable substance are used, the presence of at least one ionizable substance to be detected and, in the case of several ionizable substances, the sum of the concentrations of all ionizable substances to be detected are meant.

Each measuring cell on the measuring cell carrier is assigned a state of the PID. These states differ from each other. The PID can be operated in any one of these states. To be more precise: The PID can selectively (optionally) be operated in one of at least two different possible states. "Optionally" means: The PID can be operated in any possible state assigned to a measuring cell, and at any time the PID is in exactly one of these states—or in an optional intermediate state between two of these states, or optionally in an optional idle state, i.e. in a state which is not assigned to any measuring cell and in which no measuring cell is active and generates a signal. If N measuring cells ($N>=2$) are mounted on the measuring cell carrier, the PID can be operated in each state of at least N different possible states. This applies at least if the PID and especially all measuring cells are intact.

When the PID is operated in the state associated with the measuring cell x on the measuring cell carrier, the PID according to the invention has the following characteristics:

- A fluid connection (fluid communication) between the environment of the PID and the measuring cell x has been established. Therefore, the gas to be analyzed can reach this measuring cell x.
- The gas cannot reach at least one other measuring cell y with $y \neq x$ because this other measuring cell y is separated from the environment. Preferably, each other measuring cell y with $y \neq x$ is separated from the environment, so that the gas to be investigated from the environment can only reach the measuring cell x. Remark: $y \neq x$ means that y is not equal to x.
- Furthermore, in this state at least a part of the electromagnetic radiation emitted by the radiation source reaches the measuring cell x. Preferably, at least half, especially preferably at least three quarters, of the energy of the emitted electromagnetic radiation reaches the measuring cell x. It is also possible that the emitted electromagnetic radiation only reaches the measuring cell x.

The process according to the invention is carried out using a PID according to the invention and comprises the following steps: At least two different states are successively created, each state being associated with a respective measuring cell. Preferably, N different states are created one after the other, with N measuring cells being mounted on the measuring cell carrier and each state being assigned to a respective measuring cell on the measuring cell carrier. The process of establishing a particular state can be triggered automatically or by user input.

The step of operating the PID in the state associated with the measuring cell x comprises the following steps:

- The gas to be analyzed reaches the measuring cell x. Preferably, the gas only reaches the measuring cell x and no other measuring cell on the measuring cell carrier.
- The radiation source emits ionizing electromagnetic radiation towards the measuring cell carrier. At least a part of the emitted electromagnetic radiation also reaches the measuring cell x.
- Ionization of an ionizable substance in the gas changes the measurable electrical property of the measuring cell x compared to a condition without a sufficient amount of ionizable substance. This effect is evoked, because the measuring cell x is in fluid connection with the environment and is therefore reached by the gas under investigation.
- Depending on the electrical property of the measuring electrode of the measuring cell x, the measuring cell x generates a signal. The signal correlates with the presence and optionally with the concentration of ionizable substance in the gas.

According to the invention, the PID comprises at least two measurement cells but only one radiation source. In each state associated with a measuring cell on the measuring cell carrier, the same radiation source is used and emits electromagnetic radiation towards the measuring cell carrier. According to the invention, each measuring cell is assigned a respective state in which the PID can be operated and in which the gas under investigation and the electromagnetic radiation emitted by the same radiation source reach this measuring cell.

The PID according to the invention and the process according to the invention lead in particular to the following advantages:

- The PID according to the invention comprises at least two measurement cells, but only one radiation source. At least one of these at least two measurement cells is in fluid connection with the environment when the PID is operated in the associated state. At least one further measuring cell is separated from the environment. In many cases, the lifetime of a measuring cell is less than the lifetime of the radiation source and of other components of the PID. Thus, the invention increases the lifetime of a PID according to the invention compared to a PID comprising only a single measuring cell.
- If one measuring cell of the PID according to the invention has failed, it is in many cases still possible to continue using the PID, namely with the measuring cell or each measuring cell still intact. In particular it is possible but, thanks to the invention, not necessary, to immediately replace a failed measuring cell with an intact one in order to continue using the PID, or even to replace the entire PID.
- The PID according to the invention usually does not consume or does not consume significantly more electrical energy than a PID with only one measuring cell. Indeed, the largest electrical consumer of a PID is usually the radiation source and not a measuring cell. The PID according to the invention also has only one radiation source. The measuring cells can often be implemented as passive electrical components which do not consume any electrical energy.
- Because the PID according to the invention preferably has only one radiation source, but not multiple radiation sources, only one radiation source needs to be adjusted and calibrated and monitored. In addition, often multiple radiation sources require more space and more electrical power than just one. In some cases, multiple radiation sources result in more thermal energy being generated and emitted. A PID with multiple radiation sources also often has a heavier weight.

The PID according to the invention is configured as follows: If the PID is operated in that state which is assigned to a measuring cell x, at least a part of the emitted electromagnetic radiation reaches this measuring cell x. Preferably—measured by radiation energy—at least half of the electromagnetic radiation reaches the measuring cell x, especially preferably at least three quarters. Preferably, the center axis of a field of the emitted electromagnetic radiation, for example the center axis of a radiation cone, is directed toward the measuring cell x. Ideally, the entire electromagnetic radiation reaches the measuring cell x, in particular because the emitted electromagnetic radiation is focused on this measuring cell x.

In a simple embodiment the first measuring cell and a second mirroring cell are mounted on the measuring cell carrier. In a first state the first measuring cell is in the fluid connection with the environment and the second measuring cell is separated from the environment in a fluid-tight manner. In a second state the second measuring cell is in the fluid connection with the environment and the first measuring cell is separated from the environment in a fluid-tight manner. In a generalisation N measuring cells are mounted on the measuring cell carrier wherein N>2 holds. In every state exactly one measuring cell is in a fluid connection with the environment, and every other measuring cell is separated from the environment in a fluid-tight manner. In one alternative embodiment at least three measuring cells are mounted on the measuring cell carrier. In every state in which the PID can be operated a respective fluid connection is established between the environment and every measuring cell of a first set of measuring cells whereas every measuring cell of a second set of measuring cells is separated in a fluid-tight manner from the environment. At every time point, the first set consists of at least two measuring cells on the measuring cell carrier. Depending on the current state of the PID every measuring cell on the measuring cell carrier belongs to the first set or to the second set. The second set consists of at least one measuring cell on the measuring cell carrier. The number of measuring cells which belong to the first set. i.e. are in a respective fluid connection with the environment, is the same in every state of the PID. It depends on the current state of the PID which measuring cells belong to the first set and which do not.

If N>=3 measuring cells are mounted on the measuring cell carrier and if the first set consists of K>=2 measuring cells, the PID has at least N and at most $$\binom{N}{K} = N!/[K! * (N-K)!]$$

different possible states.

In a preferred embodiment, each measuring cell is assigned a concentration range. This concentration range comprises a lower threshold (lower limit, lower bound) and an upper threshold (upper limit, upper bound). At least if the concentration of ionizable substance in the gas lies within this concentration range, the measuring cell is able to generate a signal which comprises at least the information whether the concentration of ionizable substance lies within the assigned concentration range or not. Preferably, if the concentration is in the assigned concentration range, the signal additionally comprises information about the measured concentration. Preferably, if the concentration is above the upper threshold, the measuring cell is capable of generating a signal comprising information that ionizable substance is present at a concentration equal to or above the upper threshold. If the concentration is below the assigned concentration range, or if no ionizable substance is present at all, the measuring cell is not necessarily capable of generating a reliable signal. As a rule, if the concentration is below the lower threshold, the measuring cell is unable to distinguish whether or not the gas under investigation contains any ionizable substance at all.

It is possible that the same concentration range is assigned to all measuring cells. Even in this embodiment, the advantages of the invention described above are achieved.

In a preferred further implementation of the embodiment with the concentration ranges, however, at least two concentration ranges of the plurality of measurement cells of the PID differ from each other. The two or at least two concentration ranges may overlap or be disjoint to each other. In the case of three measurement cells, it is possible that two measurement cells are assigned the same concentration range and the third measurement cell is assigned a different concentration range. In many cases, this implementation results in the PID according to the invention being able to measure the concentration of ionizable substance in a relatively large overall concentration range, namely when the concentration falls within at least one assigned concentration range. In many cases it is technically not possible or at least more costly or more elaborated to provide a single measuring cell which is able to measure the concentration sufficiently reliably in such a large overall concentration range as the PID according to the further implementation with different concentration ranges.

In some cases, the advanced implementation with the at least two different concentration ranges makes it possible to automatically detect a fault of the PID, namely a defective measuring cell. With two different concentration ranges, the lower threshold of a first concentration range is usually a smaller value than the lower threshold of a second concentration range. The first concentration range is assigned to a first measuring cell on the measuring cell carrier, the second concentration range to a second measuring cell. The intact first measuring cell detects the presence of ionizable substance when the actual concentration value is above the first (smaller) concentration value lower threshold, the intact second measuring cell when the actual concentration value is above the second (larger) concentration value lower threshold. If the second measuring cell, i.e. the one with the larger lower threshold of the concentration range, detects the presence of ionizable substance, but the first measuring with the smaller threshold cell does not, there is an error. As a rule, the first measuring cell is defective. It is also possible that the second measuring cell incorrectly detects an ionizable substance (false alarm).

It is also possible that the upper threshold of the first concentration range is smaller than the upper threshold of the second concentration range, but the lower thresholds are the same. In this case, too, there is an error if the first measuring cell detects the presence of ionizable substance while the second measuring cell does not.

According to the invention, at least one measuring cell on the measuring cell carrier is always in fluid connection with the environment during operation, and the gas to be investigated from the environment can therefore reach at least one measuring cell. This is true except for an optional intermediate period in which the PID is transferred from one state to another state, and except for an optional idle state (resting state) in which the PID is switched off.

In a preferred embodiment, during an operation of the PID, exactly one (one and only one) measuring cell is always in fluid connection with the environment, while the or each other measuring cell is separated from the environment and therefore gas from the environment cannot reach that other measuring cell. Or K>=2 measuring cells are in the respective fluid connection with the environment whereas N−K measuring cells are separated from the environment in a fluid-tight manner with N>K. These effects are preferably achieved as follows: The PID comprises a housing having at least one opening in the housing. Gas to be investigated in the environment can only reach a measuring cell of the PID through the opening or at least one opening in the housing. Note: It is possible that no measuring cell is in fluid connection during a relatively short time span during use, namely when transferring the PID from one active measuring cell to another active measuring cell. When the PID is not in use, preferably all measuring cells are separated from the environment.

In other words, if the PID is operated in the state associated with the measuring cell x, a fluid connection is established between the environment and the measuring cell x, with this fluid connection passing through the opening or an opening in the housing. The housing separates at least one other, preferably any other, measuring cell y (y≠x) from the environment so that gas from the environment cannot reach any other measuring cell y. Preferably, this opening can be closed with a shutter or closure, this shutter closing the opening when the PID is in an idle state.

It is possible that the housing comprises a single opening, whereby gas from the environment can pass through this opening into the interior of the housing. Each fluid connection between the environment and a measuring cell on the measuring cell carrier leads through the same opening.

It is possible that a movable orifice plate is arranged between an opening in the housing and the measuring cell carrier, whereby this orifice plate can release or interrupt a fluid connection. Preferably at least one aperture (opening) is arranged in this orifice plate. A fluid connection between the environment and the measuring cell guides through this aperture in the orifice plate. It is also possible that the housing comprises several openings, for example one opening per measuring cell on the measuring cell carrier, and the orifice plate is arranged between these openings and the measuring cell carrier.

An embodiment was already described in which N>=3 measuring cells are mounted on the measuring cell carrier. At every time point K>=2 of these measuring cells are in a respective fluid connection with the environment whereas the remaining N−K measuring cells are separated from the environment in a fluid-tight manner. What K measuring cells on the measuring cell carrier are in a respective fluid connection with the environment depends on the current state of the PID.

In one implementation the housing comprises K openings. In this implementation the measuring cell carrier is preferably movable relative to the housing, in particular rotatable. The K openings establish K fluid connections between K measuring cells and the environment. The housing separates the remaining N−K measuring cells from the environment in a fluid-tight manner. In a further implementation the housing comprises N openings, namely one opening per measuring cell. The orifice plate mentioned above is movable with respect to the housing and comprises K apertures. The K apertures in the orifice plate establish K fluid connections between K measuring cells and the environment. The orifice plate separates the remaining N−K measuring cells from the environment in a fluid-tight manner, optionally in cooperation with the housing and/or with the measuring cell carrier.

The arrangement that exactly one measuring cell or at least not every measuring cell is in fluid connection with the environment during an operation further increases the service life of the PID according to the invention compared to a PID comprising only one measuring cell or in which each measuring cell is permanently in fluid connection with the environment during an operation. At any time during operation, pollutant gases and particles can only reach exactly one measuring cell thanks to the configuration according to the invention. As a rule, deposits can only form on the measuring cell that is currently in fluid connection with the environment.

The arrangement that at any time during operation exactly one measuring cell or at least not every measuring cell is in fluid connection with the environment can be applied both if the same concentration range is assigned to each measuring cell and if a total of at least two different concentration ranges are assigned to the measuring cells.

The feature according to the invention that at any time during an operation at least one, preferably exactly one, measuring cell is in fluid connection with the environment and at least one other, preferably every other, measuring cell is separated from the environment in a fluid-tight manner, leads in many cases to a relatively long service life (life span) in a time-controlled automated operation of the PID as described below.

A sequence of time points is specified, for example an equidistant sequence. Between two immediately successive time points of this sequence, the PID is operated in the same state, this state being assigned to a measuring cell. In the period between these two points in time, the same measuring cell is, or the same K measuring cells are therefore continuously in fluid connection with the environment, so that a gas to be investigated can reach this measuring cell(s). At least a part of the emitted electromagnetic radiation reaches the same measuring cell(s). The or at least one, preferably each further measuring cell is separated from the environment. At each point in the sequence, the state of the PID is changed. This change causes at least one other measuring cell, rather than the prior one(s), to be in fluid connection with the environment. The electromagnetic radiation reaches this other measuring cell(s). In order to change the state of the PID, the measuring cell carrier and/or an opening or an orifice plate of the PID are moved relative to the housing accordingly. In many cases, this embodiment results in a relatively uniform load on the measuring cells over time and further increases the life of the PID according to the invention. It is possible, but not required thanks to the embodiment, that a user must initiate or cause the step to change the state of the PID and place another measuring cell in fluid connection with the environment.

According to the invention, the measuring cells are mounted on the measuring cell carrier. In one embodiment, the measuring cell carrier together with the measuring cells can be rotated about an axis of rotation relative to the radiation source and also relative to an optional housing of the PID. Each measuring cell is associated with a respective rotational position of the measuring cell carrier relative to the housing. In this embodiment, each rotational position defines a respective state of the PID. When the measuring cell carrier is in that rotational position which is assigned to the measuring cell x, a fluid connection is established between this measuring cell x and the environment of the PID. At least a part of the emitted electromagnetic radiation then reaches the measuring cell x. A similar implementation is valid for an embodiment in which K>=2 measuring cells are simultaneously in a respective fluid connection with the environment and the remaining N−K measuring cells are separated from the environment in a fluid-tight manner.

In one implementation, the PID comprises a housing with a single opening. If the measuring cell carrier is in the rotational position associated with a measuring cell x, this measuring cell x or a channel to this measuring cell x overlaps with the opening so that a fluid connection is established between this measuring cell and the environment. Preferably, the housing and optionally the measuring cell carrier prevent any other measuring cell y (y≠x) from being in fluid connection with the environment at the same time.

The embodiment with the movable, in particular rotatable measuring cell carrier allows the other components of the PID, in particular the radiation source as well as an optional drive for the measuring cell carrier, to be fixed relative to a housing of the PID. In particular, neither a movable opening nor a shutter or closure for an opening are required. Thanks to the movable measuring cell carrier, each measuring cell can be moved relative to the radiation source to a position in which the measuring cell lies in the radiation direction of the emitted electromagnetic radiation. It is sufficient that the radiation source emits the electromagnetic radiation in a relatively narrow beam, for example with a relatively narrow cone. Therefore, a relatively small radiation source is sufficient for many applications. A small radiation source requires less space, often has a longer lifetime than a larger radiation source, and often consumes less electrical energy.

In one embodiment, a user can rotate the measuring cell carrier about the axis of rotation by an engagement from the outside, for example with the aid of an actuating element or because the measuring cell carrier protrudes over the housing. This embodiment eliminates the need for a drive or actuator and power supply for this drive/actuator.

In another implementation, the measuring cell carrier is rotatably w.rt.t. the housing and is connected to a shaft in a rotationally fixed manner. A controllable actuator is able to rotate the shaft and thus the measuring cell carrier about the axis of rotation. Preferably, the longitudinal axis of the shaft is equal to the axis of rotation about which the measuring cell carrier is rotatable, optionally parallel to this axis of rotation. The actuator for the measuring cell carrier can be mounted completely inside the housing.

It is possible for a user to specify a concentration range that is assigned to a measuring cell on the measuring cell carrier or is included in the concentration range assigned to a measuring cell. A signal-processing control unit of the PID processes this user input and determines to which measuring cell the selected or comprising concentration range is assigned. The control unit controls the actuator, and the controlled actuator rotates the measuring cell carrier to the rotational position associated with that measuring cell. It is also possible that the user actuates an actuating element, and in response to the actuation the actuator rotates the measuring cell carrier to the respective next rotational position. It is also possible that markings for the concentration ranges are arranged on the outside of the housing. The user can use these markings to manually rotate the measuring cell carrier into a desired rotational position.

In another embodiment, the actuator automatically performs the sequence described below at least once, for example after a corresponding control by the control unit. In performing this sequence, the actuator rotates the measuring cell carrier successively to each rotational position associated with a measuring cell. As a result, each measuring cell on the measuring cell carrier in turn is in fluid connection with the environment and can generate a signal. Preferably, all other measurement cells are separated from the environment. At least a portion of the electromagnetic radiation reaches each measuring cell that is in fluid connection with the environment. Thus, while the sequence is being performed, the PID is operated sequentially in each state associated with a measuring cell on the measuring cell carrier. This embodiment covers a significantly larger overall concentration range than if only a single measuring cell were used. Performing the sequence ensures that each measuring cell is actually used in succession and generates a signal. The load over time during use can be distributed relatively evenly among the measuring cells.

In one embodiment, this sequence is carried out in response to a corresponding user input. It is also possible that when the PID is used, this sequence is continuously repeated without the need for user input. In this way, it can be achieved that all measuring cells are loaded approximately equally over time. In particular, it is possible that a sequence of time points is predefined (given), and the sequence is automatically triggered again at each time point.

In one embodiment, the PID according to the invention is able to automatically detect the event that a measuring cell is defective, for example because a short circuit is detected or the measuring cell does not detect the presence of ionizable substance, although another measuring cell with a lower assigned concentration range has detected ionizable substance. Preferably, if a defective measuring cell has been detected, this measuring cell is excluded from the sequence just described.

Further above, an embodiment was described in which the measuring cell carrier is rotatable about an axis of rotation. An alternative embodiment makes it possible to provide a measuring cell carrier that is stationary relative to the housing, in particular a measuring cell carrier that is fixed to the housing. It is also possible to combine the alternative embodiment described below with a rotatably mounted measuring cell carrier.

In this alternative embodiment, the PID includes an orifice plate (aperture plate) having an aperture (opening). This orifice plate is rotatable relative to the measuring cell carrier about an axis of rotation. Preferably, the orifice plate is also rotatable relative to the housing and/or relative to the radiation source about the axis of rotation. Each measurement cell is associated with a respective rotational position of the orifice plate and thus to the aperture in the orifice plate. Each rotational position of the orifice plate defines a respective state of the PID. If the orifice plate is in the rotation position assigned to the measuring cell x, the aperture in the orifice plate establishes a fluid connection between this measuring cell x and the environment. Preferably, the orifice plate prevents another measuring cell y (y≠x) from coming or standing in fluid connection with the environment. It is also possible that at least two apertures are inserted into the orifice plate and therefore at least two measuring cells are simultaneously in a respective fluid connection with the environment. Preferably, the measuring cell carrier is fixedly connected to the housing.

In one embodiment the PID can selectively be operated in a monitoring mode or in a measuring mode. When being operated in the monitoring mode, exactly one measuring cell is in a fluid connection with the environment whereas the or every other measuring cell is separated from the environment in a fluid-tight manner. When operated in the measuring mode, at least two measuring cells are simultaneously in a respective fluid connection with the environment. In one implementation, in the measuring mode every measuring cell is in a respective fluid connection with the environment. In an alternative implementation, also in the measuring mode at least one measuring cell is separated from the environment in a fluid-tight manner. The implementations described above for selectively establishing a fluid connection between a measuring cell and the environment or separating the measuring cell from the environment can also be applied for the embodiment with the monitoring mode and the measuring mode.

Preferably the PID is first operated in the monitoring mode. The PID is arranged as follows: The event that the PID operated in the monitoring mode detects an ionizable substance triggers the step that the PID automatically switches itself into the measuring mode. Preferably the PID operated in the measuring mode switches itself back into the monitoring mode as soon as the PID has no longer discovered ionizable substance.

The embodiment with the monitoring mode and the measuring mode combines the benefit of a longer life span and the benefit of a higher reliability. As long as the PID is operated in the monitoring mode, only one measuring cell is in a fluid connection with the environment, and only one measuring cell is subjected to a higher load from the environment. Preferably the PID operated in the monitoring mode is subsequently operated in different states, each state assigned to a measuring cell as described above. When being operated in the measuring mode, the PID measures with at least two active measuring cells. By this implementation a higher reliability is achieved. In the measuring mode it is possible to combine the signals from the at least two active measuring cells.

The PID according to the invention may be configured as a portable device with its own power supply unit, for example with multiple rechargeable batteries. Preferably, a user may carry the PID in one hand or on or at the body and carry it in an area to be monitored for the ionizable substance. The PID may also be a stationary device connected or connectable to a stationary power supply network.

Preferably, in addition to the states described above, each state being associated with a measuring cell, the PID can be placed in a rest or idle state, preferably in which the entire interior of the PID is separated from the environment.

In the following, the invention is described by means of an embodiment example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a perspective view showing, from the viewing direction of FIG. 2, the fourth embodiment in which the measuring cell carrier is stationary, and the radiation source is rotatable and a rotatable aperture plate is provided.

DESCRIPTION OF PREFERRED EMBODIMENTS

Figure 1:
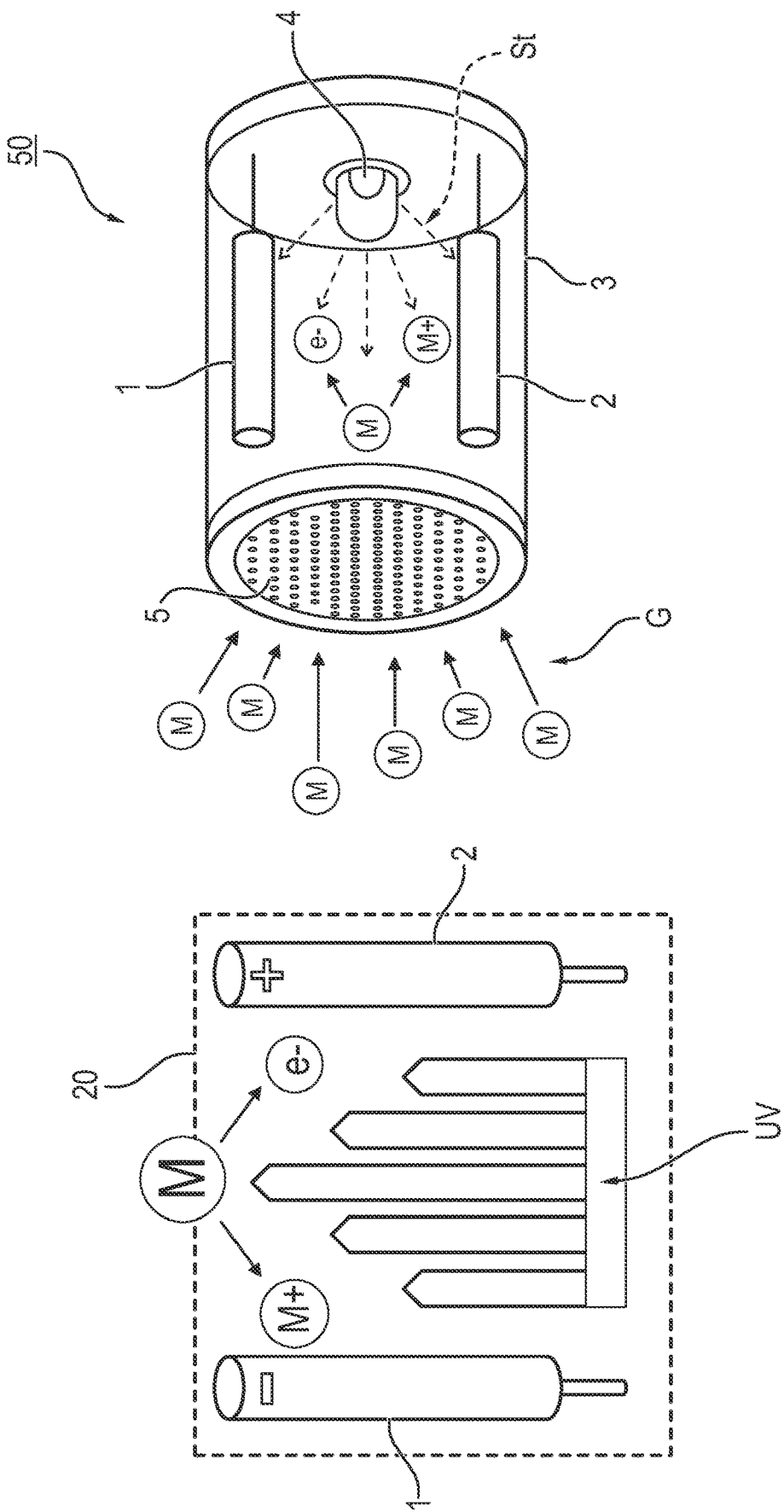
FIG. 1 is a schematic view showing a basic configuration of a photo-ionization detector (PID)

Referring to the drawings, FIG. 1 shows the basic configuration of a photo-ionization detector 50, abbreviated as PID in the following. A PID is at least capable of determining whether or not at least one ionizable substance is present in a spatial area to be monitored. The area to be monitored is, for example, the interior of a building or vehicle or aircraft, or even an open-air area, such as a refinery or other production facility.

Many volatile organic substances to be detected are ionizable and can therefore be detected using a PID. Optionally, a PID can detect not only the presence but also the concentration of ionizable substance in a gas present in the area.

It is possible that several ionizable substances are present in the area. In this case, the PID is often able to detect the sum of the concentrations of the ionizable substances. In the following, "the presence" and "the concentration" of ionizable substance are referenced for short, and this can also mean several ionizable substances present at the same time. The "concentration" is the summed concentration of all ionizable substances to be detected.

An ionizable substance may occur as a component of a gas G in the area to be monitored. A quantity of the gas G may flow from the area through a porous membrane 5 into the interior of a housing 3 of the PID 50, for example diffuse into it, and/or be drawn in by a pump of the PID 50 that is not shown.

Inside the housing 3 are a measuring electrode 1, a counter electrode 2 and a radiation source 4, optionally a reference electrode not shown. The measuring electrode 1 is electrically insulated from the counter electrode 2. Preferably, the distance between the two electrodes 1 and 2 is below 1 mm.

The radiation source 4 emits ionizing electromagnetic radiation UV in a radiation direction St into the interior of the housing 3. Preferably, the radiation source 4 emits ultraviolet light (wavelength between 100 nm and 380 nm), particularly preferably hard UV light (wavelength between 100 nm and 280 nm).

In one implementation, an electrical voltage is applied to the radiation source 4, and in one implementation, an AC voltage is applied. The applied voltage excites a plasma inside the radiation source 4. The excited plasma emits ultraviolet light. It is also possible that an arrangement with several LEDs or with at least one laser diode acts as the radiation source 4.

A PID is able to detect the presence and optionally the concentration of ionizable substance, but generally not to distinguish different ionizable substances from each other. The electromagnetic radiation emitted by the radiation source 4 must therefore, on the one hand, have sufficient intensity to ionize any substance that may occur in the gas G and is to be detected to a sufficient, i.e. measurable, extent. On the other hand, it should be avoided that any other substance in the gas, which is also ionizable and is not to be detected, for example oxygen, is ionized. Ionization of oxygen usually simulates the presence of an ionizable substance to be detected.

These two requirements specify a range for the intensity of the emitted electromagnetic radiation. Preferably, the intensity is between 9 eV and 11 eV (eV=electron volt), and particularly preferably it is 10.6 eV. In many applications, electromagnetic radiation with this intensity ionizes the volatile substances to be detected, but not oxygen.

The emitted electromagnetic radiation penetrates a measuring path inside the housing 3 and ionizes the substance or each substance which has flowed into the interior of the housing 3 as a component of the gas G and can be ionized by the ionization energy of the electromagnetic radiation. The or at least part of the molecules M of the or each ionizable substance in the housing 3 are split. Positively charged particles are attracted by the counter electrode 2, negatively charged parts are picked up by the measuring electrode 1.

A sensor not shown measures an indication of the electrical voltage between the two electrodes 1 and 2, or the electrical voltage that occurs between two measuring points of the measuring electrode 1, or the strength or amount (electrical charge) of the current that flows through the measuring electrode 1. This voltage or current or charge or quantity acts as the measurable electrical property of the measuring electrode 1 and correlates with the presence and optionally the quantity or concentration of ionizable substance in the gas G. By the configuration of the PID 50, the volume of the interior of the housing 3, i.e. the volume of the measuring chamber and thus the volume of the gas sample under investigation, is known. From this known measurement chamber volume and the measured amount or concentration of ionizable substance in the measurement chamber, the concentration of ionizable substance in the gas G can be derived.

In the following, the term "measuring cell" is used for a component comprising a measuring electrode 1 and optionally a counter electrode 2 and optionally a reference electrode, wherein a measuring chamber is arranged between the two electrodes 1 and 2 and/or around the two electrodes 1 and 2. In many cases, such a measuring cell is a passive electrical component, thus does not consume any electrical energy. A prior art PID 50 comprises a measuring cell 20 with two electrodes 1 and 2 and optionally with a reference electrode, a radiation source 4 and a housing 3 which is in fluid connection with the environment. Such a measuring cell 20 is shown in FIG. 1 as a component of the PID 50.

A measuring cell 20 of a PID is capable of detecting the presence and optionally the concentration of ionizable substance in a gas G present in the measuring chamber, provided that the concentration of ionizable substance is within a predetermined concentration range for the measuring cell 20. This concentration range includes, for example, the range between 0.1 ppm to 2 ppm or from 2 ppm to 2000 ppm (ppm=parts per million). A measuring cell 20 of a PID is tailored to a concentration range. If the concentration is above the upper threshold (upper limit) of the specified concentration range, the measuring cell 20 is generally capable of providing a signal indicating the presence of ionizable substance greater than or equal to the upper threshold. If, on the other hand, the concentration is below the lower threshold (lower limit) of the specified concentration range, the measuring cell 20 is not capable of detecting the presence of ionizable substance. If the concentration of ionizable substance is within the concentration range, the measuring cell 20 generally provides a signal that correlates with the concentration. As a rule, the greater the concentration of ionizable substance in the gas G, the stronger the signal.

FIG. 2 to FIG. 7 show various embodiments of a PID 100 according to the invention. This PID 100 is capable of detecting the presence and optionally the concentration of ionizable substance in a gas G and thus of monitoring a spatial region in which the gas G may occur. Identical reference signs have the same meanings as in FIG. 1. The PID 100 according to the invention thus comprises, just like the PID 50 according to the prior art, a housing 3 and a radiation source 4. The radiation source 4 emits electromagnetic radiation in a radiation direction St, cf. FIG. 4 to FIG. 7. The radiation direction St is preferably the center axis of the conically emitted electromagnetic radiation.

Preferably, the PID 100 comprises its own power supply unit, for example at least one accumulator, and is therefore not dependent on a stationary power supply network. This embodiment allows the PID 100 to be switched off as a portable device. The invention can also be used for a PID 100 that is connected or connectable to a stationary voltage supply network, in particular for a stationary PID.

In one embodiment, the PID 100 comprises an output unit (not shown). The PID 100 is capable of outputting on this output unit the presence and optionally the measured concentration of ionizable substance in a form perceptible by a human. Alternatively, the PID 100 is capable of causing this information to be output on a spatially remote display unit.

In one embodiment, the PID 100 comprises an alarm unit. On this alarm unit, the PID 100 outputs an alarm in a form perceptible by a human if the concentration of ionizable substance is above a predetermined concentration threshold. For example, the PID 100 vibrates to output an alarm. It is also possible for the PID 100 to generate a message, the message comprising information about the presence and optionally about the measured concentration. This message is transmitted to a spatially remote receiver. The receiver outputs the message in a form that can be perceived by a human.

In the embodiment example, the PID 100 according to the invention comprises three measuring cells 20.1, 20.2, 20.3. It is also possible that a PID 100 according to the invention comprises only two measuring cells or at least four measuring cells.

Each measuring cell 20.1, 20.2, 20.3 comprises a measuring electrode 1.1, 1.2, 1.3 and a counter electrode 2.1, 2.2, 2.3. Each measuring cell 20.1, 20.2, 20.3 can be constructed in the same way as the measuring cell 20 described with reference to FIG. 1. Each measuring cell 20.1, 20.2, 20.3 is tailored to one concentration range each for the concentration of ionizable substance in the gas G. The three concentration ranges of the three measuring cells 20.1, 20.2, 20.3 may be the same or may differ from each other. It is possible that the three concentration ranges overlap or are also disjoint to each other in pairs. It is also possible that two concentration ranges are the same and the third is different.

The three measuring cells 20.1, 20.2, 20.3 are each accommodated in a respective receptacle A.1, A.2, A.3 of a measuring cell carrier 10 and fastened there and cannot move relative to the measuring cell carrier 10. In each case at least one electrical contact per measuring cell 20.1, 20.2, 20.3 on the receptacle A.1, A.2, A.3 passes on an electrical signal from this measuring cell 20.1, 20.2, 20.3. In the embodiment example, the measuring cell carrier 10 is rotationally symmetrical with respect to a center axis MA. Preferably, the measuring cell carrier has the shape of a disk. Between the measuring cell carrier 10 and the area which is to be monitored for the presence of ionizable substance, there is a cover (lid) 13 which is connected to the housing 3 in a fluid-tight manner, see FIG. 4 and FIG. 5.

A rear plate (back plate) 17 is mounted on the measuring cell carrier 10 and faces away from the cover 13. This rear plate 17 is transparent for electromagnetic radiation from the source 4 but separates the measuring cells 20.1, 20.2, 20.3 from each other and from the space around the source 4 in a fluid-tight manner. Thanks to the plate 17 ideally no gas from the environment can reach a measuring cell 20.1, 20.2, 20.3 from backwards, i.e. through the space between the source 4 and the plate 17. In one embodiment the receptacles A.1, A.2, A.3 are integrated into the rear plate 17. It is also possible that the receptacles A.1, A.2, A.3 are integrated in a further plate wherein the plate 17 is arranged between the further plate and the source 4.

In a preferred embodiment, the cover 13 is detachably connected to the housing 3 and can be removed for maintenance. With the cover 13 removed, the measuring cell carrier 10 can be removed from the housing 3 and reinserted later. Each measuring cell 20.1, 20.2, 20.3 can be removed from the receptacle A.1, A.2, A.3 and reinserted. This embodiment makes it easier to replace a defective measuring cell 20.1, 20.2, 20.3. It is also possible that each measuring cell 20.1, 20.2, 20.3 is firmly inserted in the assigned receptacle A.1, A.2, A.3 and can only be replaced together with the entire measuring cell carrier 10.

In one embodiment the cover 13 remains in its position relative to the housing 3 during an operation of the PID 100. In a further embodiment the cover 13 can be rotated relative to the housing 3 about the center axis MA. Also in the embodiment with the rotatable cover 13 the cover 13 is connected with the housing 3 in a fluid-tight manner.

In one embodiment, a mechanical filter (not shown), for example a fleece (nonwoven), is located between the cover 13 and each measuring cell 20.1, 20.2, 20.3. It is also possible that there is one continuous mechanical filter for all measuring cells 20.1, 20.2, 20.3. The mechanical filter for a measuring cell 20.1, 20.2, 20.3 is located between the measuring cell 20.1, 20.2, 20.3 and the cover 13 and is connected to the receptacle A.1, A.2, A.3. It is also possible that the mechanical filter or each mechanical filter is recessed in the cover 13. The associated filter reduces the risk of particles and pollutants reaching the measuring cell 20.1, 20.2, 20.3. Preferably, a mechanical filter can be replaced with the cover 13 removed, for example if it is clogged or defective.

Figure 2:
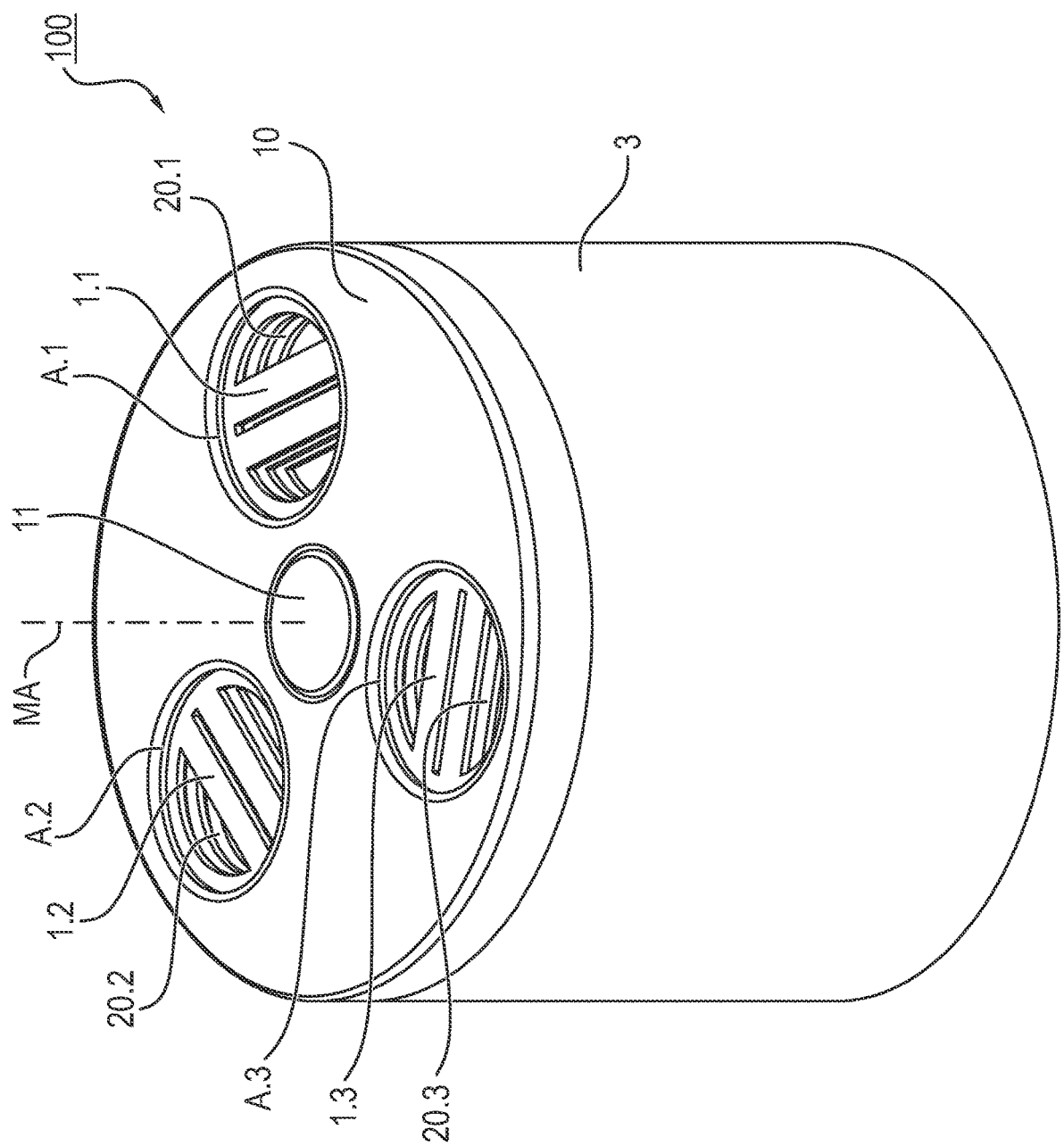
FIG. 2 is a perspective view showing a PID according to the invention, with the cover omitted.
Figure 3:
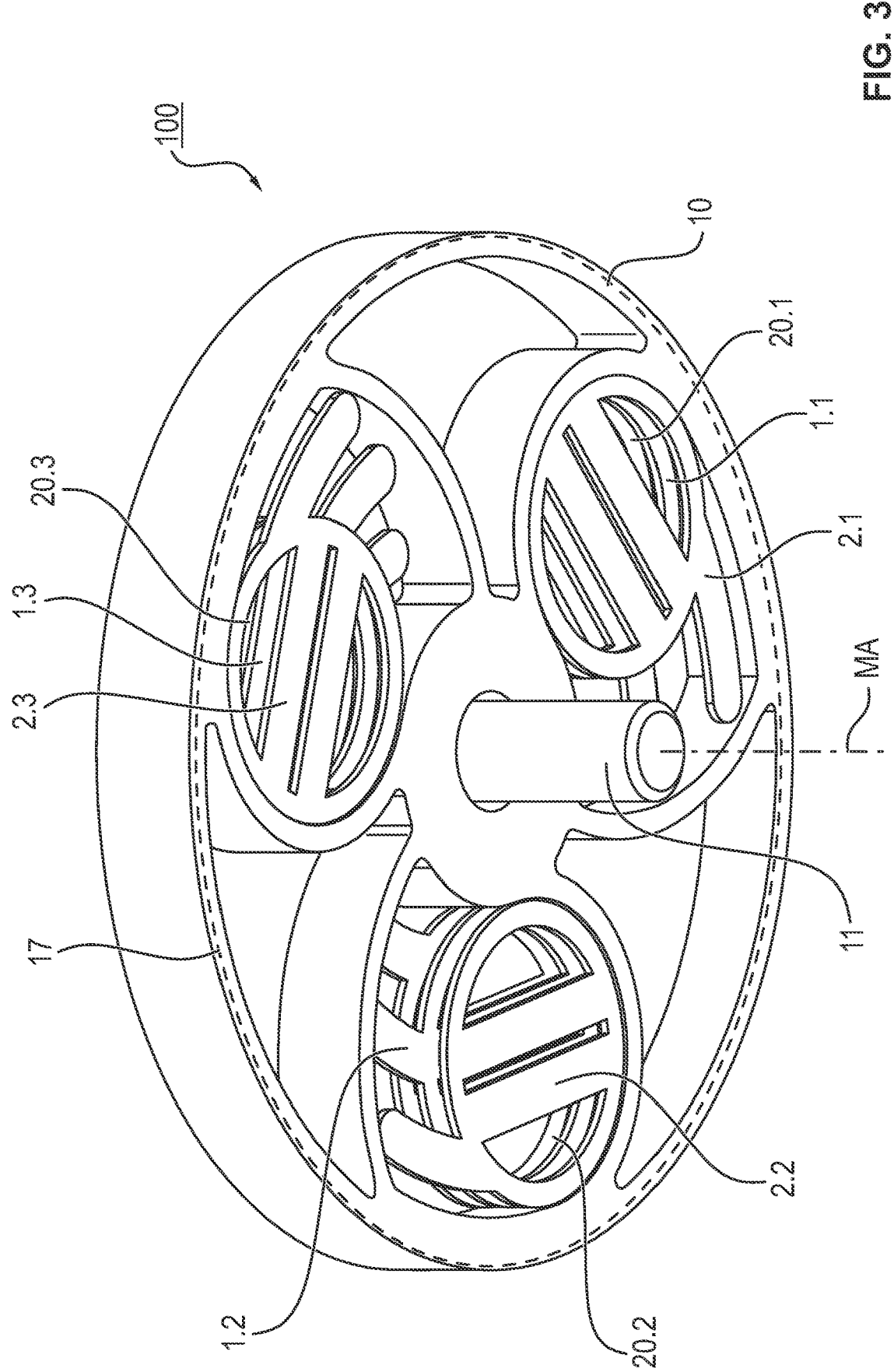
FIG. 3 is a perspective view showing the measuring cell carrier of the embodiment of FIG. 2.

FIG. 2 shows this measuring cell carrier 10 as well as the housing 3 from a viewing direction obliquely from above, in which the measuring cells 20.1, 20.2, 20.3 point towards the viewer, whereby the cover 13 for the housing 3 is not shown. The radiation source 4 is located inside the housing 3 and diagonally below the measuring cell carrier 10. The measuring cell carrier 10 is thus located between the radiation source 4 and the cover 13. FIG. 3 shows the measuring cell carrier 10 from a viewing direction diagonally from below, with the housing 3 omitted. In the viewing direction of FIG. 3, the cover 13 is located diagonally behind the measuring cell carrier 10 and cannot be seen.

At any time during an operation of the PID 100, at least one measuring cell 20.1, 20.2, 20.3, preferably exactly one measuring cell 20.1, 20.2, 20.3, is in fluid connection with the spatial area to be monitored, so that the gas G from the area to be monitored can reach this measuring cell 20.1, 20.2, 20.3. It is possible that in a resting state the PID 100 and thus all measuring cells 20.1, 20.2, 20.3 are completely separated from the environment.

Different embodiments are possible as to how, during an operation, the gas G is caused to reach at least one measuring cell 20.1, 20.2, 20.3. These configurations are described below with reference to FIG. 4 to FIG. 7. The three measuring cells 20.1, 20.2, 20.3 are shown only schematically in FIG. 4 to FIG. 7. In most embodiments of the PID 100 according to the invention, not every measuring cell 20.1, 20.2, 20.3 is permanently in fluid connection with the environment during use, but only exactly one at a time.

Figure 4:
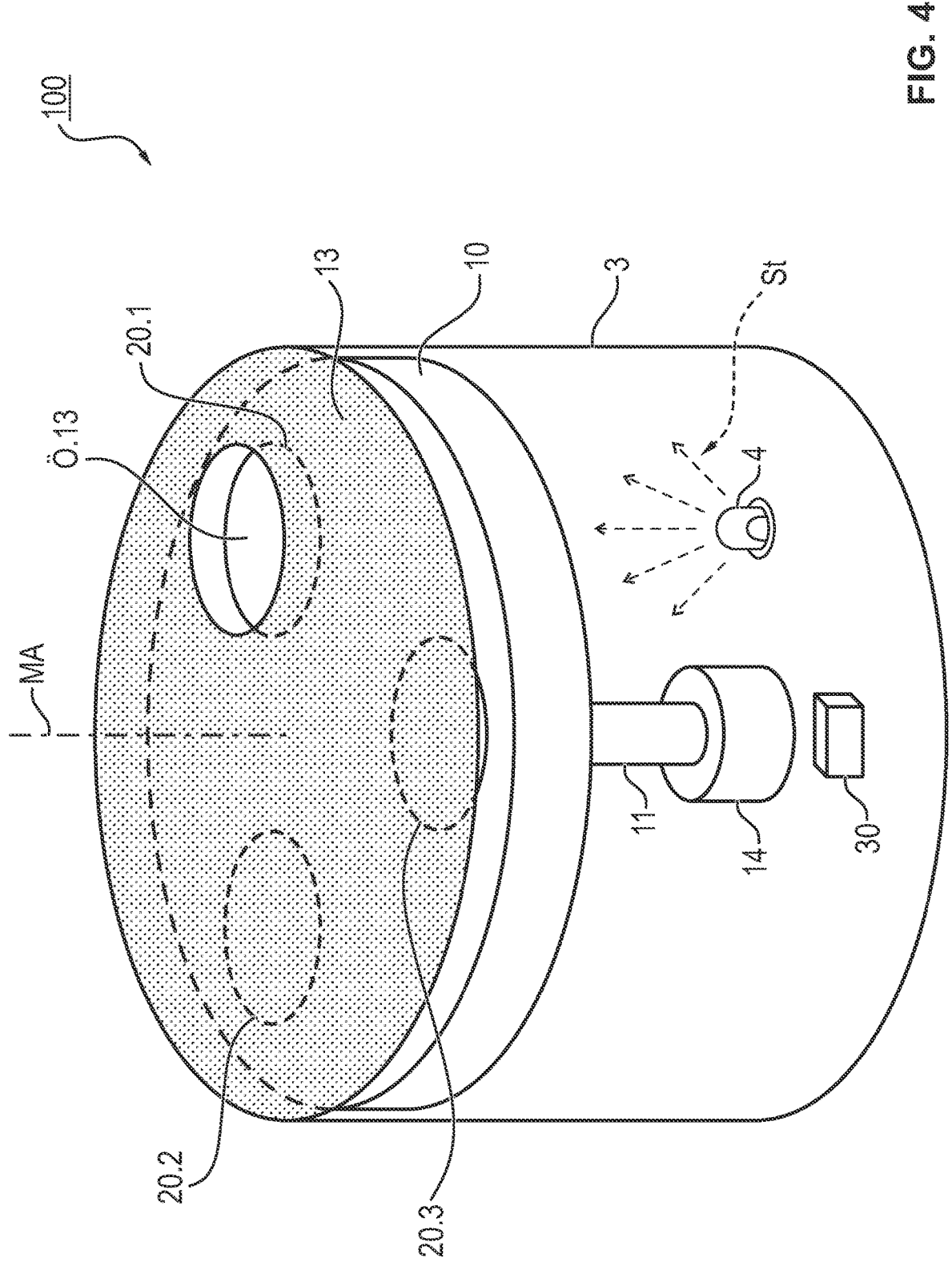
FIG. 4 is a perspective view showing, from the viewing direction of FIG. 2, the first embodiment in which the measuring cell carrier is rotatable and the cover has a single opening.

FIG. 4 shows a first embodiment of the PID 100. An opening Ö.13 is formed into the cover 13, which is arranged eccentrically, i.e. spaced from the center axis MA. Preferably, the cover 13 is mechanically and detachably connected to the housing 3, for example by a screw lock, snap lock or snap-in lock, and is not moved relative to the housing 3 during use, but is only optionally removed for cleaning or repair. Preferably, the radiation source 4 is fixedly connected to the housing 3. Preferably, the radiation source 4 is also spaced from the center axis MA, i.e., eccentrically arranged. The radiation direction St is parallel to the center axis MA and directed toward the opening Ö.13. It is sufficient that the radiation source 4 emits electromagnetic radiation in the form of a relatively narrow cone.

The measuring cell carrier 10 is rotatable relative to the housing 3, the cover 13 and the radiation source 4 about the center axis MA. In one implementation, the measuring cell carrier is connected to a shaft 11 in a rotationally fixed manner. A controllable actuator 14 is able to rotate the shaft 11 and thus the measuring cell carrier 10 together with the measuring cells 20.1, 20.2, 20.3 about the center axis MA. The actuator 14 can be arranged inside or outside the housing 3, in the embodiments according to FIG. 4, FIG. 6 and FIG. 7 it is located inside the housing 3. A signal processing control unit 30 (schematically shown) can optionally process user inputs, which are described below, and control the actuator 14 in response to a user input and optionally to measured values and/or depending on a signal of a system clock of the PID 100. In particular the control unit 30 can receive and process a respective signal from every measuring cell.

Each measuring cell 20.1, 20.2, 20.3 is assigned a respective rotational position of the measuring cell carrier 10 10 relative to the cover 13 and relative to the radiation source 4. If the measuring cell carrier 10 is in that rotational position which is assigned to the measuring cell 20.x (x=1, 2,3), then this measuring cell 20.x is located between the radiation source 4 and the opening Ö.13. Preferably, the radiation source 4, the measuring cell 20.x and the opening Ö.13 lie on a line. The electromagnetic radiation emitted in the radiation direction St therefore penetrates the measuring cell 20.x. The measuring cell 20.x is in fluid connection with the area to be monitored via the opening Ö.13, so that the gas G to be examined can reach the measuring cell 20.x through the opening Ö.13. Preferably, the cover 13 prevents a relevant amount of the gas G from reaching another measuring cell 20.y (y≠x). This reduces the risk that the further measuring cell 20.y is damaged by harmful gases or deposits. For example, only a narrow gap occurs between the cover 13 and the measuring cell carrier 10.

The actuator 14 is configured to rotate the measuring cell carrier 10 to any rotational position assigned to a measuring cell 20.1, 20.2, 20.3, i.e. in the embodiment example to one of three possible rotational positions. Preferably, the actuator 14 holds the measuring cell carrier 10 in this rotational position until the actuator 14 is controlled again. A snap lock or a latch lock holds the measuring cell carrier 10 in a certain rotational position and the actuator 14 is able to rotate the measuring cell carrier 10 against the force of this lock.

In the embodiment example, an angle of 360°/N occurs for N measuring cells between two adjacent rotation positions. It is also possible that the rotation positions are unequally distributed over a full circle.

Instead of an actuator or in addition to the actuator 14, the measuring cell carrier 10 may also be mechanically connected to a handle or other actuating element (not shown). A user may actuate the actuating element from the outside to manually rotate the measuring cell carrier 10 relative to the housing 3 and thus relative to the radiation source 4 and the cover 13 about the center axis MA. It is also possible for the user to directly rotate the measuring cell carrier 10 relative to the housing 3, for example in the manner of a pepper grinder.

If the PID 100 comprises such an actuating element, the measuring cell carrier 10 is preferably rotatably mounted on an axle or non-rotatably connected to a rotatably mounted axle, whereby this axle takes the place of the shaft 11 of FIG. 4. Thanks to this configuration, the measuring cell carrier 10 can be rotated even if the PID 100 has no actuator 14 or if the actuator 14 or the power supply unit are defective.

If the measuring cells 20.1, 20.2, 20.3 are assigned a total of at least two different concentration ranges, a set of display elements on the housing 3 preferably indicates to the user which rotational position of the measuring cell carrier 10 belongs to which measuring cell 20.1, 20.2, 20.3 and thus to which concentration range. Preferably, the measuring cell carrier 10 engages in each rotational position for a measuring cell 20.1, 20.2, 20.3, so that the user notices the engagement.

Figure 5:
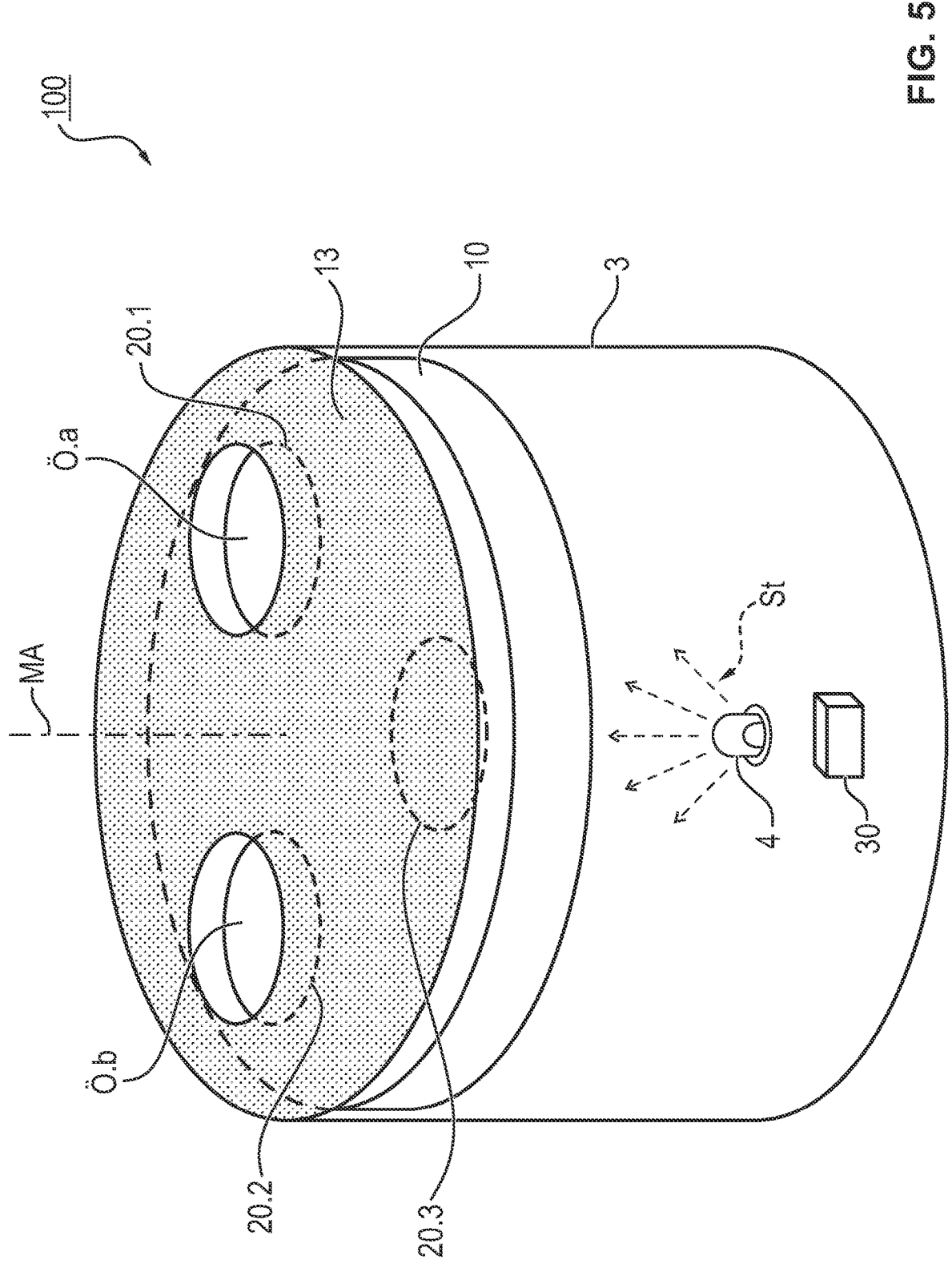
FIG. 5 is a perspective view showing, from the viewing direction of FIG. 2, the second embodiment in which the measuring cell carrier is stationary and the cover has one opening per measuring cell.

FIG. 5 shows a second embodiment in which an actuator 14 is not necessarily used. The measuring cell carrier 10 is firmly connected to the housing 3, i.e. it cannot rotate around the center axis MA. In the shown embodiment the cover 13 can be rotated relative to the housing 3 about the center axis MA and can snap in during this rotation in every one of three possible rotational positions relative to the housing 3. Two openings Ö.a, Ö.b are inserted into the cover 13. Thanks to these openings Ö.a, Ö.b in every rotational position of the cover 13, two of the three measuring cell 20.1, 20.2, 20.3 are in fluid connection with the area to be monitored during operation, so that the gas G can reach these two measuring cells. The third measuring cell is separated from the area in a fluid-tight manner. In the implementation shown in FIG. 5 the measuring cell 20.1 is in a fluid connection with the area via the opening Ö.a, the measuring cell 20.2 via the opening Ö.b. The measuring cell 20.3 is separated from the area in a fluid-tight manner.

In every time point during operation two of the three measuring cells 20.1, 20.2, 20.3 thus operate in parallel with each other in terms of time. In contrast to the first embodiment, in the second embodiment the radiation source 4 is arranged centrally so that the radiation direction St coincides with the center axis MA. Therefore, the emitted electromagnetic radiation reaches all measuring cells 20.1, 20.2, 20.3 with approximately the same intensity. In the shown implementation a user can rotate the cover 13 relative to the housing 3 from one rotational position to another rotational position.

In one embodiment, the two openings Ö.a, Ö.b have the same cross-sectional area. In another embodiment, the two openings Ö.a, Ö.b have different cross-sectional areas so that the volume flows from the area to be monitored to the three measuring cells 20.1, 20.2, 20.3 can differ from each other.

Figure 6:
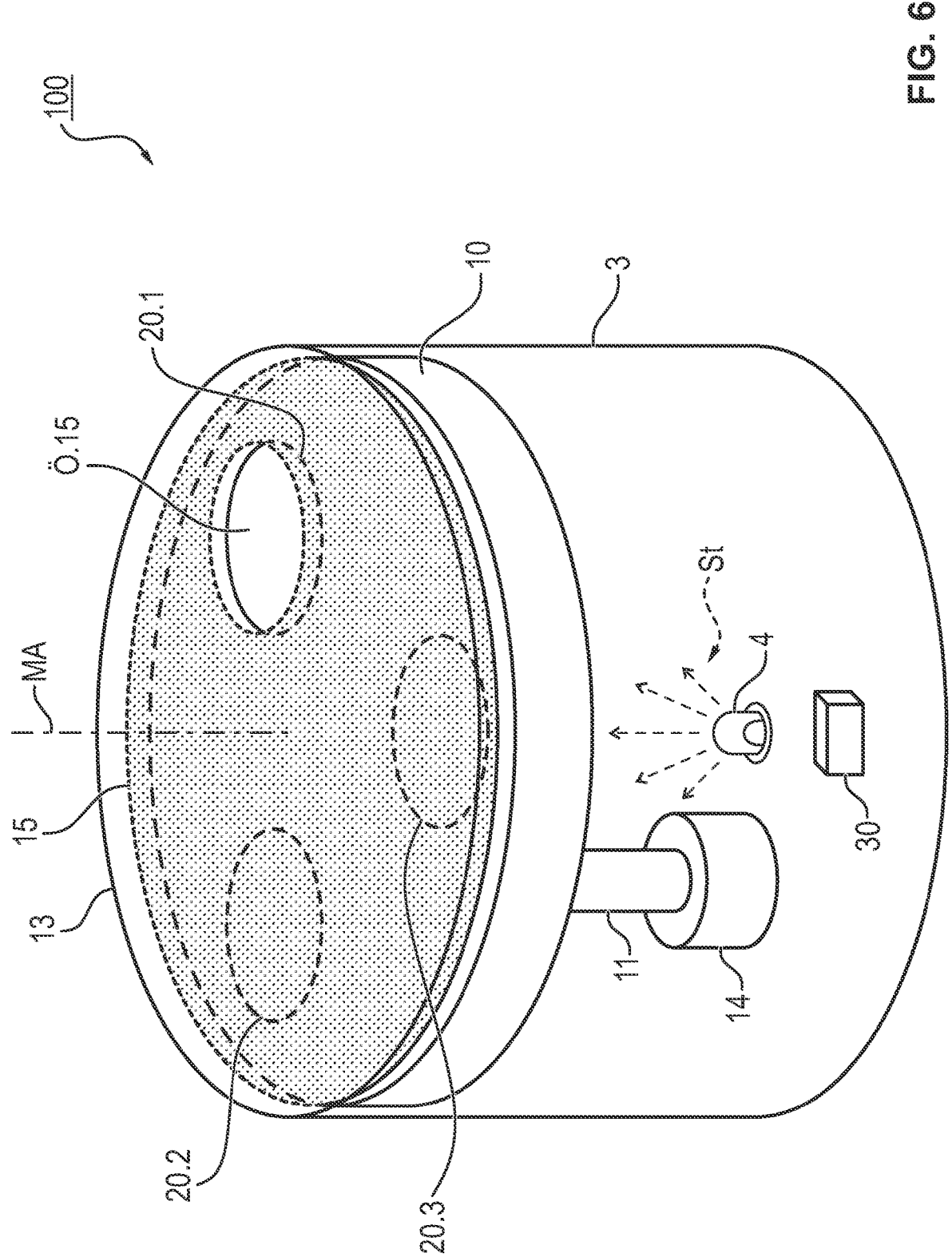
FIG. 6 is a perspective view showing, from the viewing direction of FIG. 2, the third embodiment in which the measuring cell carrier is stationary and there is a rotatable aperture plate.

FIG. 6 shows a third embodiment of the PID 100. Just as in the second embodiment, the radiation source 4 is also arranged centrally in the third embodiment and is firmly connected to the housing 3. The measuring cell carrier 10, on the other hand, is firmly connected to the housing 3, and a respective opening Ö.a, Ö.b, Ö.c is provided in the cover 13 for each measuring cell 20.1, 20.2, 20.3. These three openings Ö.a, Ö.b, Ö.c are not shown in FIG. 6. Neither the measuring cell carrier 10 nor the cover 13 can move relative to the housing 3 or relative to the radiation source 4.

Just as in the first embodiment (FIG. 4), the PID 100 according to the third embodiment comprises an actuator 14 and a shaft 11, the actuator 14 being capable of rotating the shaft 11. Between the cover 13 and the measuring cell carrier 10 is arranged an orifice plate (aperture plate) 15, which has the shape of a disc and is rotatable about the center axis MA. The orifice plate 15 preferably separates the measuring cells 20.1, 20.2, 20.3 from the environment. The orifice plate 15 is in an operative connection with the shaft 11, so that the actuator 14 can rotate the orifice plate 15 about the center axis MA by means of the shaft 11. It is possible that a distance occurs between the center axis of the shaft 11 and the center axis MA of the orifice plate 15. The orifice plate 15 has an opening Ö.15, which is spaced from the center axis MA.

Analogous to the first embodiment, in the third embodiment each measuring cell 20.1, 20.2, 20.3 on the measuring cell carrier 10 is assigned a respective rotational position of the orifice plate 15. If the orifice plate 15 is in that rotational position which is assigned to the measuring cell 20.x, a fluid connection is established through the opening Ö.15 between the measuring cell 20.x and the area to be monitored, so that the gas G can reach the measuring cell 20.x through the opening Ö.15. Preferably, the orifice plate 15 prevents another measuring cell 20.y (y≠x) from being in fluid connection with the area. For example, a narrow gap occurs between the orifice plate 15 and the measuring cell carrier 10, so that only a smaller amount of the gas G can reach the further measuring cell 20.y.

FIG. 7 shows a fourth embodiment. In contrast to all previous embodiments, the radiation source 4 is not fixed. Rather, the radiation source 4 is mounted on a cross member 7, which is preferably perpendicular or at an angle to the center axis MA. This cross member 7 is mechanically connected to the actuator 14 or to the shaft 11 in a rotationally fixed manner. The center axis MA is at the same time the axis of rotation of the shaft 11. In addition, just as in the third embodiment, a rotatable orifice plate (aperture plate) 15 is connected to the shaft 11 in a rotationally fixed manner. The measuring cell carrier 10 is arranged stationary. The actuator 14 is capable of rotating the shaft 11 and thus the radiation source 4 and the orifice plate 15 with the opening Ö.15 to any rotational position associated with a measuring cell 20.1, 20.2, 20.3. Preferably, in the fourth embodiment, the orifice plate 15 cannot rotate relative to the radiation source 4.

Different modes of operation of the PID 100 according to the invention are possible. Unless otherwise noted, each of the embodiments just described according to FIG. 4 through FIG. 7 can be combined with any of the operating modes described below. In one embodiment, a user may select an operating mode from at least two different possible operating modes.

First, operating modes are described for that form of realization of the PID 100 in which each measuring cell 20.1, 20.2, 20.3 is assigned a different concentration range, i.e. in total as many different concentration ranges as there are measuring cells are available.

In a manual operation mode that can be applied to the first embodiment (FIG. 4), the third embodiment (FIG. 6), and the fourth embodiment (FIG. 7), a user selects a concentration range. This concentration range is assigned to a measuring cell 20.x. The control unit 30 evaluates this user input and controls the actuator 14. The controlled actuator 14 rotates the measuring cell carrier 10 (first embodiment) or the orifice plate 15 (third embodiment) or the radiation source 4 and the orifice plate 15 (fourth embodiment) about the center axis MA into the rotation position assigned to this selected measuring cell 20.$x$. It is of course possible that the user successively selects at least two different concentration ranges and the actuator 14 reacts accordingly.

In an alternative embodiment, the PID 100 does not include an actuator 14, but rather a handle or other actuating element. The user rotates the measuring cell carrier 10 relative to the housing 3 to a desired rotational position. The display elements on the housing 3 show the respective rotation position for each concentration range.

In an automatic operating mode, the actuator 14 rotates the measuring cell carrier 10 or the orifice plate 15 or the radiation source 4 and the orifice plate 15 successively to each possible rotational position so that successively each measuring cell 20.1, 20.2, 20.3 is in fluid connection with the area to be monitored, this fluid connection passing through the orifice Ö.13 or Ö.15. The user does not need to select a concentration area, but only to activate the PID 100 and optionally the automatic operation mode. Preferably, the sequence of the actuator 14 rotating the measuring cell carrier 10 or the orifice plate 15 or the actuator 4 and the orifice plate 15 to each possible rotational position in turn is performed repeatedly, for example with fixed predetermined time intervals.

In many cases, a PID 100 configured in this way is able to measure the concentration of ionizable substance when this concentration falls within the concentration range of at least one measuring cell 20.1, 20.2, 20.3. The PID 100 is able to detect the presence of ionizable substance when its concentration is above the smallest lower threshold of a concentration range. A conventional PID 50, on the other hand, is only able to measure the concentration in one concentration range and is not able to detect the presence of ionizable substance if the concentration is below the lower threshold of this one concentration range.

In one implementation of the automatic operating mode, the actuator 14 moves the measuring cell carrier 10 or the orifice plate 15 or the radiation source 4 and the orifice plate 15 as follows: First, the measuring cell to which the concentration range with the largest concentrations is assigned is in fluid connection with the area to be monitored, then the measuring cell to which the concentration range with the second largest concentration is assigned, and so on. This configuration results in the presence of ionizable substance with a high concentration being detected particularly quickly.

In one possible operating mode, which can be used for the second implementation (FIG. 5), several measuring cells are active, preferably two measuring cells, of the three measuring cells 20.1, 20.2, 20.3 are active and at least one further one of the measuring cells is separated from the environment. In the embodiment example of FIG. 5 the two measuring cells 20.1, 20.2 are active and the measuring cell 20.3 is separated. This means that the control unit 30 has several signals available, in the embodiment example two signals are available, which relate to several concentration ranges, in the embodiment example two different concentration ranges. In another possible operating mode, at least one measuring cell is switched off, for example in response to a user input. Optionally, all measuring cells except one measuring cell are switched off, and only exactly one measuring cell is active.

In the following, different operating modes are described for the implementation in which the same concentration range is assigned to all measuring cells 20.1, 20.2, 20.3. Preferably, the three measuring cells 20.1, 20.2, 20.3 are of identical configuration. Because according to the invention the PID 100 comprises at least two measuring cells, in the embodiment example three measuring cells 20.1, 20.2, 20.3, redundancy is achieved. In addition, the service life of the PID 100 is extended compared to the PID 50 according to FIG. 1 because, as a rule, a measuring cell has a shorter service life than the other components of a PID.

In a time-controlled mode of operation applicable to the first embodiment, the third embodiment, and the fourth embodiment, the actuator 14 rotates the measuring cell carrier 10 or the orifice plate 15 or the radiation source 4 and the orifice plate 15 from one rotational position to another rotational position, preferably to the adjacent rotational position, in a time-controlled manner, for example at regular time intervals. With N measuring cells (N>1), the duration of use of a measuring cell 20.$x$ is 1/N of the total duration of use of the PID 100. During the remaining time, this measuring cell 20.$x$ is not in fluid connection with the environment. Ambient influences can therefore not affect this measuring cell. Because each measuring cell 20.1, 20.2, 20.3 has a significantly shorter service life than the entire PID 100, this embodiment extends the possible service life of the PID 100 compared to a PID with one measuring cell.

In one embodiment, the control unit 30 is able to automatically detect whether a measuring cell 20.1, 20.2, 20.3 is intact or defective. For example, the control unit 30 automatically detects whether a current is flowing through the measuring cell 20.1, 20.2, 20.3 or not. If the control unit 30 detects the event that the currently active measuring cell is defective, the control unit 30 triggers the event that the actuator 14 rotates the measuring cell carrier 10 or the orifice plate 15 or the radiation source 4 and the orifice plate 15 about the center axis MA to a different rotational position. The active measuring cell is the one that is currently in fluid connection with the area to be monitored. Thus, thanks to the invention, even if a measuring cell 20.1, 20.2, 20.3 fails, it is not necessary to repair or replace the PID 100 immediately.

The following embodiment can be applied in the case that the measuring cells 20.1, 20.2, 20.3 are assigned a total of at least two different concentration ranges, whereby the lower threshold of a first concentration range is smaller (a smaller concentration value) than the lower threshold of a second concentration range. For the following description, let the first concentration range be assigned to the measuring cell 20.1, the second concentration range to the measuring cell 20.2. If the measuring cells are intact, both measuring cells 20.1, 20.2 detect the presence of ionizable substance, provided that the concentration is above the larger lower limit. If, on the other hand, measuring cell 20.2 detects the presence of ionizable substance, but measuring cell 20.1 does not, there is a defect. At least one measuring cell 20.1, 20.2 and/or an optional evaluation unit is defective. The control unit 30 automatically detects this event and preferably outputs a corresponding message.

The time-controlled operating mode can be combined with the event-controlled operating mode. The actuator 14 rotates the measuring cell carrier 10 or the orifice plate 15 or the radiation source 4 and the orifice plate 15 only to such a rotation position which is assigned to an intact measuring cell. A rotation position for a defective measuring cell is skipped. This prevents a defective measuring cell from becoming an active measuring cell.

In an operating mode that can be used for the second embodiment, the control unit 30 combines the signals of plural measuring cells, i.e. in the embodiment example the signals of the two measuring cells 20.1, 20.2. For example, the control unit 30 forms a mean or median value or selects the signal with the highest concentration. This configuration leads to a particularly high reliability, because in many cases a measuring error of a measuring cell is covered or compensated.

In another operating mode, which can also be used for the second embodiment, the PID 100 can optionally be operated in a monitoring mode or in a measuring mode. In the monitoring mode, only one measuring cell is active, while in the measuring mode several or even all of the measuring cells 20.1, 20.2, 20.3 are active. The embodiments for a PID 100 according to the invention with exactly one active measuring cell can also be used for this monitoring mode. Initially, the PID 100 is operated in the monitoring mode. If the active measuring cell detects the presence of ionizable substance, the PID 100 is switched to the measuring mode automatically or also manually by a user, and the or some of the measuring cells 20.1, 20.2, 20.3 check this result. This configuration reduces the risk of false alarms. In many cases, the concentration of ionizable substance can be measured in the measuring mode with a higher reliability than in the monitoring mode. If later no ionizable substance is detected any more, the PID 100 is switched back into the monitoring mode.

While specific embodiments of the invention have been shown and described in detail to illustrate the application of the principles of the invention, it will be understood that the invention may be embodied otherwise without departing from such principles.

List of reference characters

| | |
|---|---|
| 1 | Measuring electrode of the measuring cell 20 |
| 1.1 | Measuring electrode of the measuring cell 20.1 |
| 1.2 | Measuring electrode of the measuring cell 20.2 |
| 1.3 | Measuring electrode of the measuring cell 20.3 |
| 2 | Counter electrode of the measuring cell 20 |
| 2.1 | Counter electrode of the measuring cell 20.1 |
| 2.2 | Counter electrode of the measuring cell 20.2 |
| 2.3 | Counter electrode of the measuring cell 20.3 |
| 3 | Housing of PID 50, 100, encloses radiation source 4, the or each measuring cell 20, 20.1, 20.2, 20.3, and optional actuator 14 and optional shaft 11 and optional cross member 7 |
| 4 | Radiation source in the form of a UV lamp or an LED array or a laser diode, emits electromagnetic radiation in the radiation direction St, fixed or rotatably arranged in the housing 3 |
| 5 | porous membrane in housing 3 |
| 7 | Cross member which is connected to the actuator 14 or the shaft 11 and supports the radiation source 4 |
| 10 | disc-shaped measuring cell carrier, carries the three measuring cells 20.1, 20.2, 20.3 in the recesses A.1, A.2, A.3, rotationally symmetrical to the center axis MA, rotatable about the center axis MA or arranged stationary |
| 11 | Shaft for rotating the measuring cell carrier 10 or the orifice plate (aperture plate) 15 or the radiation source 4 and the orifice plate 15, is rotated by the actuator 14 |
| 13 | Cover on housing 3, in one embodiment comprises one opening Ö.13 and in another embodiment comprises three openings Ö.a, Ö.b, Ö.c |
| 14 | controllable drive for rotating the shaft 11, in one embodiment arranged in the housing 3 |
| 15 | optional orifice (aperture) plate, rotatable relative to housing 3, non-rotatably connected to shaft 11, has opening Ö.15 |
| 17 | rear plate of the measuring cell carrier 10, is transparent and fluid-tight |
| 20 | Measuring cell of the PID 50, comprises the measuring electrode 1 and the measuring electrode 2 |
| 20.1 | Measuring cell on the measuring cell carrier 10, comprises the measuring electrode 1.1 and the counter electrode 2.1 |
| 20.2 | Measuring cell on the measuring cell carrier 10, comprises the measuring electrode 1.2 and the counter electrode 2.2 |
| 20.3 | Measuring cell on the measuring cell carrier 10, comprises the measuring electrode 1.3 and the counter electrode 2.3 |
| 30 | signal processing control unit 30-comprising one or more processors and an associated memory unit |
| 50 | PID, includes a measuring cell 20, radiation source 4, and housing 3. |
| 100 | PID according to the invention, comprises the three measuring cells 20.1, 20.2, 20.3 on the measuring cell carrier 10, the radiation source 4, the housing 3, the cover 13 and optionally the actuator 14 and the shaft 11 |
| A.1, A.2, A.3 | Recesses in the measuring cell carrier 10 for receiving one measuring cell 20.1, 20.2, 20.2 each |
| G | gas to be analyzed, may comprise at least one ionizable substance to be detected |
| M | molecule of an ionizable substance in the gas under investigation G |
| MA | center axis of the measuring cell carrier 10, in some embodiments coincides with the center axis of the shaft 11 via a |
| Ö.13 | Opening in cover 13 |
| Ö.15 | Opening in the orifice plate 15 |
| Ö.a, Ö.b, Ö.c | Openings in the cover 13 |
| St | Radiation direction in which the radiation source 4 emits electromagnetic radiation |

What is claimed is:

1. A photo-ionization detector for detecting an ionizable substance in a gas, the photo-ionization detector comprising:
    a measuring cell carrier;
    a radiation source configured to emit ionizing electromagnetic radiation towards the measuring cell carrier; and
    a plurality of measuring cells mounted on the measuring cell carrier, each of the plurality of measuring cells comprising a measuring electrode having a measurable electrical property that is at least temporarily changed or changeable by ionization of ionizable substance in the gas, each of the plurality of measuring cells being configured to generate a signal depending on the measurable electrical property, which generated signal correlates with a presence of ionizable substance in the gas,
    wherein each of the plurality of measuring cells is associated with a respective state of the photo-ionization detector and the photo-ionization detector is selectively operable in each respective state,
    wherein during operation of the photo-ionization detector in the state associated with one measuring cell of the plurality of measuring cells, a fluid connection is established between an environment of the photo-ionization detector and said one measuring cell of the plurality of measuring cells and at least a part of the emitted electromagnetic radiation reaches said one measuring cell of the plurality of measuring cells and at least one other measuring cell of the plurality of measuring cells is fluid-tightly separated from the environment.

2. The photo-ionization detector according to claim 1, wherein:
   each measuring cell is assigned a concentration range; and
   each measuring cell is configured such that the signal generated by this measuring cell comprises information as to whether or not ionizable substance with a concentration lying in the assigned concentration range is contained in the gas.

3. The photo-ionization detector according to claim 2, wherein at least two concentration ranges differ from each other.

4. The photo-ionization detector according to claim 3, wherein:
   a first measuring cell of the plurality of measuring cells is assigned a first concentration range;
   a second measuring cell of the plurality of measuring cells is assigned a second concentration range;
   a lower threshold of the first concentration range is a smaller concentration value than a lower threshold of the second concentration range, and
   the photo-ionization detector is configured to automatically generate an error message if the event combination occurs that the second measuring cell generates a signal that ionizable substance is contained in the gas and the first measuring cell does not generate a signal that ionizable substance is contained in the gas or generates a signal that no ionizable substance is contained in the gas.

5. The photo-ionization detector according to claim 1, further comprising a housing, wherein:
   the housing surrounds the measuring cell carrier and the measuring cells of the plurality of measuring cells;
   the housing comprises an opening; and
   the housing separates the measuring cell carrier and the measuring cells of the plurality of measuring cells from the environment such that in the state associated with said one measuring cell of the plurality of measuring cells, the gas reaches said one measuring cell of the plurality of measuring cells only through the opening and does not reach the or at least one other measuring cell of the plurality of measuring cells.

6. The photo-ionization detector according to claim 5, wherein:
   a sequence of time points is predefined;
   the photo-ionization detector is configured such that between two immediately successive time points of the sequence, the photo-ionization detector is operated in the state associated with said one measuring cell of the plurality of measuring cells, and both the gas and at least part of the emitted electromagnetic radiation reach said one measuring cell of the plurality of measuring cells, and
   the photo-ionization detector is configured such that upon reaching a time point of the sequence, the photo-ionization detector causes or enables a movement of the measuring cells of the plurality of measuring cells relative to the housing or enables a movement of the opening relative to the housing; and
   the photo-ionization detector is configured such that after the time point of the sequence the photo-ionization detector is operated in another state associated with the other measuring cell of the plurality of measuring cells and the gas and at least a part of the emitted electromagnetic radiation reaches the other measuring cell of the plurality of measuring cells.

7. The photo-ionization detector according to claim 1, wherein:
   the measuring cell carrier together with the measuring cells of the plurality of measuring cells is rotatable relative to the radiation source about an axis of rotation;
   each measuring cell is assigned a respective rotational position of the measuring cell carrier; and
   the photo-ionization detector is configured such that with the measuring cell carrier in the rotational position associated with said one measuring cell of the plurality of measuring cells, the fluid connection is established between said one measuring cell of the plurality of measuring cells and the environment of the photo-ionization detector and at least a part of the emitted electromagnetic radiation reaches said one measuring cell of the plurality of measuring cells.

8. The photo-ionization detector according to claim 7, further comprising an actuator for rotating the measuring cell carrier about the axis of rotation, wherein the actuator is configured to rotate the measuring cell carrier sequentially to each associated rotational position as a sampling sequence.

9. The photo-ionization detector according to claim 8, wherein a sequence of sampling time points is specified, wherein the photo-ionization detector is configured to trigger the actuator to restart the execution of the sampling sequence at each of the sampling time points of the sequence of sampling time points.

10. The photo-ionization detector according to claim 1, further comprising an aperture plate having an opening, wherein:
    the aperture plate is located between the measuring cell carrier and the environment of the photo-ionization detector and is rotatable relative to the measuring cell carrier about an axis of rotation with each measuring cell being assigned a respective rotational position of the aperture plate;
    the photo-ionization detector is configured such that with the aperture plate in a rotational position associated with one measuring cell of the plurality of measuring cells, a fluid connection is established between said one measuring cell of the plurality of measuring cells and the environment of the photo-ionization detector, which fluid connection passes through the opening in the aperture plate, and at least a part of the emitted electromagnetic radiation reaches said one measuring cell of the plurality of measuring cells.

11. The photo-ionization detector according to claim 10, further comprising an actuator for rotating the aperture plate about the axis of rotation, wherein the actuator is configured to rotate the aperture plate sequentially to each associated rotational position as a sampling sequence.

12. The photo-ionization detector according to claim 1, wherein the photo-ionization detector can selectively be operated in a monitoring mode or in a measuring mode, wherein in the monitoring mode exactly one measuring cell is in a fluid connection with the environment, wherein in the measuring mode at least two measuring cells are simultaneously in a respective fluid connection with the environment and wherein the photo-ionization detector is configured such that the event that the photo-ionization detector operated in the monitoring mode detects ionizable substance triggers the step that the photo-ionization detector automatically switches into the measuring mode.

13. A process for detecting an ionizable substance in a gas, the process comprising:
- providing a photo-ionization detector comprising: a radiation source; a measuring cell carrier; and a plurality of measuring cells mounted on the measuring cell carrier, each of the measuring cells of the plurality of measuring cells comprising a measuring electrode having a measurable electrical property and each of the measuring cells of the plurality of measuring cells being associated with a respective state of the photo-ionization detector;
- operating the photo-ionization detector sequentially in at least two different associated states, with operation of the photo-ionization detector in the state associated with one measuring cell of the plurality of measuring cells comprising the steps of:
  - establishing a fluid connection between an environment of the photo-ionization detector and the associated measuring cell of the plurality of measuring cells such that the gas reaches the associated measuring cell of the plurality of measuring cells;
  - emitting ionizing electromagnetic radiation from the radiation source towards the measuring cell carrier such that at least a part of the emitted electromagnetic radiation reaches the associated measuring cell of the plurality of measuring cells;
  - with an ionization of ionizable substance in the gas changing the measurable electrical property of the associated measuring cell of the plurality of measuring cells, generating with the associated measuring cell of the plurality of measuring cells a signal depending on the measurable electrical property, which signal correlates with a presence of ionizable substance in the gas; and
  - separating at least one another measuring cell of the plurality of measuring cells from the environment.

14. The process according to claim 13, wherein:
- the photo-ionization detector comprises a housing surrounding the measuring cell carrier and the measuring cells of the plurality of measuring cells;
- an opening is formed in the housing;
- the housing separates the measuring cell carrier and the measuring cells of the plurality of measuring cells from the environment such that the gas reaches the measuring cells of the plurality of measuring cells only through the opening in the housing;
- during operation of the photo-ionization detector in the state associated with the one measuring cell of the plurality of measuring cells, the gas reaches the associated measuring cell of the plurality of measuring cells and at least one other measuring cell is separated from the environment;
- the photo-ionization detector is operated in a first time period in a first state associated with a first one measuring cell of the plurality of measuring cells, and the gas reaches the one measuring cell of the plurality of measuring cells in the first time period; and
- the photo-ionization detector is operated in a subsequent second time period in a second state associated with a second one measuring cell of the plurality of measuring cells being different from the first measuring cell, and the gas reaches the second measuring cell of the plurality of measuring cells in the second time period;
- at least one of the plurality of measuring cells and the opening is moved relative to the housing between the first time period and the second time period to transfer the photo-ionization detector from the first state to the second state.

* * * * *